United States Patent
Gravely et al.

(10) Patent No.: US 8,489,122 B2
(45) Date of Patent: Jul. 16, 2013

(54) SYSTEM AND METHOD FOR TOTAL FLIGHT TIME RATIO PATTERN MATCHING

(75) Inventors: Thomas B. Gravely, Herndon, VA (US); Martin Alles, Vienna, VA (US); Suryanarayana Kalenahalli, Chantilly, VA (US); Khalid W. Al-Mufti, Sterling, VA (US)

(73) Assignee: Andrew LLC, Hickory, NC (US)

( * ) Notice: Subject to any disclaimer, the term of this patent is extended or adjusted under 35 U.S.C. 154(b) by 188 days.

(21) Appl. No.: 13/112,690

(22) Filed: May 20, 2011

(65) Prior Publication Data

US 2012/0149390 A1 Jun. 14, 2012

Related U.S. Application Data

(60) Provisional application No. 61/421,485, filed on Dec. 9, 2010.

(51) Int. Cl.
*H04W 24/00* (2009.01)

(52) U.S. Cl.
USPC .................................. 455/456.5; 455/456.1

(58) Field of Classification Search
USPC ........................................ 455/456.1–456.6
See application file for complete search history.

(56) References Cited

U.S. PATENT DOCUMENTS

| | | | |
|---|---|---|---|
| 3,150,372 A | 9/1964 | Groth, Jr. | |
| 3,659,085 A | 4/1972 | Potter et al. | |
| 4,728,959 A | 3/1988 | Maloney | |
| 4,814,751 A | 3/1989 | Hawkins | |
| 4,845,504 A | 7/1989 | Roberts et al. | |
| 4,891,650 A | 1/1990 | Sheffer | |
| 5,056,106 A | 10/1991 | Wang | |
| 5,218,618 A | 6/1993 | Sagey | |
| 5,317,323 A | 5/1994 | Kennedy et al. | |
| 5,327,144 A | 7/1994 | Stilp et al. | |
| 5,365,544 A | 11/1994 | Schilling | |

(Continued)

FOREIGN PATENT DOCUMENTS

| | | |
|---|---|---|
| JP | 06-347529 | 12/1994 |
| WO | 2006088472 A1 | 8/2006 |

OTHER PUBLICATIONS

Y. Zhao, "Standardization of Mobile Phone Positioning for 3G Systems," IEEE Communications Magazine, Jul. 2002, pp. 108-116.

(Continued)

*Primary Examiner* — George Eng
*Assistant Examiner* — Nam Huynh
(74) *Attorney, Agent, or Firm* — Duane Morris LLP (57) ABSTRACT

A method and system for estimating the location of a mobile device. A range of the mobile device to a reference station may be determined as a function of the time of transmission of a first signal transmitted from a base station and as a function of the time of receipt of a second signal transmitted from the mobile device to the reference station, the second signal being a function of the first signal advanced by a timing parameter. A relationship for each of a plurality of grid points in a geographic region may be determined as a function of the determined range and a range metric. These plural grid points may contain the reference station. The determined relationship may be compared with data corresponding to each of the plural grid points, and a location of the mobile device determined as a function of the comparison.

22 Claims, 4 Drawing Sheets

U.S. PATENT DOCUMENTS

| | | |
|---|---|---|
| 5,372,144 A | 12/1994 | Mortier et al. |
| 5,404,376 A | 4/1995 | Dent |
| 5,423,067 A | 6/1995 | Manabe |
| 5,465,289 A | 11/1995 | Kennedy |
| 5,506,863 A | 4/1996 | Meidan et al. |
| 5,506,864 A | 4/1996 | Schilling |
| 5,508,708 A | 4/1996 | Ghosh et al. |
| 5,512,908 A | 4/1996 | Herrick |
| 5,515,419 A | 5/1996 | Sheffer |
| 5,519,760 A | 5/1996 | Borkowski et al. |
| 5,559,864 A | 9/1996 | Kennedy |
| 5,592,180 A | 1/1997 | Yokev et al. |
| 5,608,410 A | 3/1997 | Stilp et al. |
| 5,614,914 A | 3/1997 | Bolgiano et al. |
| 5,675,344 A | 10/1997 | Tong et al. |
| 5,736,964 A | 4/1998 | Ghosh et al. |
| 5,815,538 A | 9/1998 | Grell et al. |
| 5,825,887 A | 10/1998 | Lennen |
| 5,870,029 A | 2/1999 | Otto et al. |
| 5,920,278 A | 7/1999 | Tyler et al. |
| 5,952,969 A | 9/1999 | Hagerman et al. |
| 5,959,580 A | 9/1999 | Maloney et al. |
| 5,960,341 A | 9/1999 | LeBlanc et al. |
| 5,973,643 A | 10/1999 | Hawkes et al. |
| 5,987,329 A | 11/1999 | Yost |
| 6,014,102 A | 1/2000 | Mitzlaff et al. |
| 6,047,192 A | 4/2000 | Maloney |
| 6,091,362 A | 7/2000 | Stilp |
| 6,097,336 A | 8/2000 | Stilp |
| 6,097,709 A | 8/2000 | Kuwabara |
| 6,097,959 A | 8/2000 | Yost |
| 6,101,178 A | 8/2000 | Beal |
| 6,108,555 A | 8/2000 | Maloney et al. |
| 6,108,558 A | 8/2000 | Vanderspool, II |
| 6,115,599 A | 9/2000 | Stilp |
| 6,115,605 A | 9/2000 | Siccardo et al. |
| 6,119,013 A | 9/2000 | Maloney et al. |
| 6,127,975 A | 10/2000 | Maloney |
| 6,144,711 A | 11/2000 | Raleigh et al. |
| 6,172,644 B1 | 1/2001 | Stilp |
| 6,184,829 B1 | 2/2001 | Stilp |
| 6,188,351 B1 | 2/2001 | Bloebaum |
| 6,191,738 B1 | 2/2001 | Pfeil et al. |
| 6,201,499 B1 | 3/2001 | Hawkes et al. |
| 6,201,803 B1 | 3/2001 | Munday et al. |
| 6,212,319 B1 | 4/2001 | Cayrefourcq |
| 6,233,459 B1 | 5/2001 | Sullivan et al. |
| 6,246,884 B1 | 6/2001 | Karmi et al. |
| 6,266,013 B1 | 7/2001 | Stilp et al. |
| 6,269,246 B1 | 7/2001 | Rao et al. |
| 6,281,834 B1 | 8/2001 | Stilp |
| 6,285,321 B1 | 9/2001 | Stilp et al. |
| 6,288,675 B1 | 9/2001 | Maloney |
| 6,288,676 B1 | 9/2001 | Maloney |
| 6,295,455 B1 | 9/2001 | Fischer et al. |
| 6,311,043 B1 | 10/2001 | Haardt et al. |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,351,235 B1 | 2/2002 | Stilp |
| 6,366,241 B2 | 4/2002 | Pack |
| 6,388,618 B1 | 5/2002 | Stilp et al. |
| 6,393,294 B1 | 5/2002 | Perez-Breva et al. |
| 6,400,320 B1 | 6/2002 | Stilp et al. |
| 6,407,703 B1 | 6/2002 | Minter et al. |
| 6,449,486 B1 | 9/2002 | Rao |
| 6,463,290 B1 | 10/2002 | Stilp et al. |
| 6,470,195 B1 | 10/2002 | Meyer |
| 6,477,161 B1 | 11/2002 | Hudson |
| 6,483,460 B2 | 11/2002 | Stilp et al. |
| 6,492,944 B1 | 12/2002 | Stilp |
| 6,501,955 B1 | 12/2002 | Durrant et al. |
| 6,519,465 B2 | 2/2003 | Stilp et al. |
| 6,546,256 B1 | 4/2003 | Maloney |
| 6,553,322 B1 | 4/2003 | Ignagni |
| 6,563,460 B2 | 5/2003 | Stilp et al. |
| 6,571,082 B1 | 5/2003 | Rahman |
| 6,591,112 B1 | 7/2003 | Siccardo et al. |
| 6,603,428 B2 | 8/2003 | Stilp |
| 6,603,761 B1 | 8/2003 | Wang |
| 6,640,106 B2 | 10/2003 | Gutowski et al. |
| 6,646,604 B2 | 11/2003 | Anderson |
| 6,661,379 B2 | 12/2003 | Stilp et al. |
| 6,765,531 B2 | 7/2004 | Anderson |
| 6,771,625 B1 | 8/2004 | Beal |
| 6,771,969 B1 | 8/2004 | Chinoy |
| 6,782,264 B2 | 8/2004 | Anderson |
| 6,782,265 B2 | 8/2004 | Perez-Breva et al. |
| 6,834,234 B2 | 12/2004 | Scherzinger et al. |
| 6,839,539 B2 | 1/2005 | Durrant et al. |
| 6,845,240 B2 | 1/2005 | Carlson et al. |
| 6,859,172 B2 | 2/2005 | Powers et al. |
| 6,871,077 B2 | 3/2005 | Kennedy, Jr. |
| 6,873,290 B2 | 3/2005 | Anderson et al. |
| 6,876,859 B2 | 4/2005 | Anderson et al. |
| 6,920,329 B2 | 7/2005 | Kennedy, Jr. et al. |
| 6,922,170 B2 | 7/2005 | Alexander, Jr. |
| 6,944,465 B2 | 9/2005 | Spain et al. |
| 6,952,158 B2 | 10/2005 | Kennedy, Jr. |
| 6,987,979 B2 | 1/2006 | Carlsson |
| 6,996,392 B2 | 2/2006 | Anderson |
| 7,023,383 B2 | 4/2006 | Stilp et al. |
| 7,116,987 B2 | 10/2006 | Spain, Jr. et al. |
| 7,167,713 B2 | 1/2007 | Anderson |
| 7,167,714 B2 | 1/2007 | Dressler et al. |
| 7,233,799 B2 | 6/2007 | Spain, Jr. |
| 7,250,907 B2 | 7/2007 | Krumm et al. |
| 7,257,414 B2 | 8/2007 | Spain, Jr. et al. |
| 7,271,765 B2 | 9/2007 | Stilp et al. |
| 7,340,259 B2 | 3/2008 | Maloney |
| 7,383,051 B2 | 6/2008 | Spain, Jr. et al. |
| 7,427,952 B2 | 9/2008 | Bull et al. |
| 7,433,652 B2 | 10/2008 | Durgin |
| 7,433,695 B2 | 10/2008 | Gordon et al. |
| 7,440,762 B2 | 10/2008 | Maloney et al. |
| 7,460,505 B2 | 12/2008 | Spain |
| 7,593,738 B2 | 9/2009 | Anderson |
| 7,653,004 B2 * | 1/2010 | Strutt ........................... 370/252 |
| 7,725,111 B2 | 5/2010 | Dressler et al. |
| 7,734,298 B2 | 6/2010 | Bhattacharya et al. |
| 7,753,278 B2 | 7/2010 | Spain, Jr. et al. |
| 7,796,966 B2 | 9/2010 | Bhattacharya et al. |
| 7,848,762 B2 | 12/2010 | Gordon et al. |
| 7,899,467 B2 | 3/2011 | Feuerstein et al. |
| 8,013,785 B2 | 9/2011 | Bhattacharya et al. |
| 8,068,802 B2 | 11/2011 | Bhattacharya et al. |
| 8,068,855 B2 | 11/2011 | Dressler et al. |
| 8,106,817 B2 | 1/2012 | Bhattacharya et al. |
| 8,106,818 B2 | 1/2012 | Bhattacharya et al. |
| 8,155,394 B2 | 4/2012 | Allegra et al. |
| 2002/0172223 A1 | 11/2002 | Stilp et al. |
| 2003/0064734 A1 | 4/2003 | Stilp et al. |
| 2003/0139188 A1 | 7/2003 | Chen et al. |
| 2003/0190919 A1 | 10/2003 | Niemenmaa |
| 2003/0203738 A1 | 10/2003 | Brown et al. |
| 2004/0043775 A1 | 3/2004 | Kennedy, Jr. et al. |
| 2004/0132466 A1 | 7/2004 | Kennedy, Jr. et al. |
| 2004/0203539 A1 | 10/2004 | Benes et al. |
| 2004/0203921 A1 | 10/2004 | Bromhead et al. |
| 2004/0218664 A1 | 11/2004 | Kennedy, Jr. et al. |
| 2004/0252752 A1 | 12/2004 | Kennedy, Jr. et al. |
| 2005/0058182 A1 | 3/2005 | Kennedy, Jr. et al. |
| 2005/0136945 A1 | 6/2005 | Kennedy, Jr. et al. |
| 2005/0164712 A1 | 7/2005 | Kennedy, Jr. et al. |
| 2005/0192026 A1 | 9/2005 | Carlson et al. |
| 2006/0003695 A1 | 1/2006 | Kennedy, Jr. et al. |
| 2006/0003775 A1 | 1/2006 | Bull et al. |
| 2006/0030333 A1 | 2/2006 | Ward et al. |
| 2006/0116130 A1 | 6/2006 | Kennedy, Jr. et al. |
| 2006/0125695 A1 | 6/2006 | Kennedy, Jr. et al. |
| 2006/0141998 A1 | 6/2006 | Kennedy, Jr. et al. |
| 2006/0154607 A1 | 7/2006 | Kennedy, Jr. et al. |
| 2006/0240836 A1 | 10/2006 | Kennedy, Jr. et al. |
| 2007/0087689 A1 | 4/2007 | Kennedy, Jr. et al. |
| 2007/0111746 A1 | 5/2007 | Anderson et al. |
| 2007/0155401 A1 | 7/2007 | Ward et al. |
| 2007/0155489 A1 | 7/2007 | Beckley et al. |

| | | | |
|---|---|---|---|
| 2007/0202885 A1 | 8/2007 | Kennedy, Jr. et al. | |
| 2008/0132244 A1 | 6/2008 | Anderson et al. | |
| 2008/0132247 A1 | 6/2008 | Anderson et al. | |
| 2008/0137524 A1 | 6/2008 | Anderson et al. | |
| 2008/0158059 A1 | 7/2008 | Bull et al. | |
| 2008/0160952 A1 | 7/2008 | Bull et al. | |
| 2008/0160953 A1 | 7/2008 | Mia et al. | |
| 2008/0161015 A1 | 7/2008 | Maloney et al. | |
| 2008/0248811 A1 | 10/2008 | Maloney et al. | |
| 2008/0261611 A1 | 10/2008 | Mia et al. | |
| 2008/0261612 A1 | 10/2008 | Mia et al. | |
| 2008/0261613 A1 | 10/2008 | Anderson et al. | |
| 2008/0261614 A1 | 10/2008 | Mia et al. | |
| 2009/0005061 A1 | 1/2009 | Ward et al. | |
| 2010/0323723 A1* | 12/2010 | Gerstenberger et al. | 455/456.5 |
| 2011/0039574 A1* | 2/2011 | Charbit et al. | 455/456.1 |
| 2011/0065453 A1* | 3/2011 | Baldemair et al. | 455/456.1 |
| 2011/0287784 A1* | 11/2011 | Levin et al. | 455/456.2 |
| 2012/0129551 A1* | 5/2012 | Islam | 455/456.1 |

OTHER PUBLICATIONS

C. Drane, M. MacNaughtan, and C. Scott, "Positioning GSM Telephones," IEEE Communications Magazine, Apr. 1998, pp. 46-54, 59.

J. Caffery, Jr., and G. Stuber, "Overview of Radiolocation in CDMA Cellular Systems," IEEE Communications Magazine, Apr. 1998, pp. 38-45.

T. Rappaport, J.H. Reed and B.D. Woerner, "Position Location Using Wireless Communications on Highways of the Future," IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, and V. Apte, "Capacity Analysis of the GSM Short Message Service", Indian Institute of Technology Bombay, www.cse.iitb.ac.in/~varsha/allpapers/wireless/ncc03cam. pdf, 2004, pp. 1-5.

J.D. Bard, and F.M. Ham, "Time Difference of Arrival Dilution of Precision and Applications," IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C.B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7, Jul. 1989, pp. 996-1000.

B. Yang, "Projection Approximation Subspace Tracking," IEEE Transactions on Signal Processing, vol. 43, No. 1, Jan. 1995, pp. 95-107.

Rick Roberts, "Project: IEEE P802.15 Working Group for Wireless Personal Area Networks (WPANS)," Harris Corporation, Melbourne Florida, Oct. 4, 2004, pp. 1-11.

Stephanie Bell, A Beginners Guide to Uncertainty of Measurement, The National Physics Laboratory of the United Kingdom of Great Britain and Northern Ireland, Teddington, Middlesex, UK, 2001, pp. 1-41.

Amir Leshem, Mati Wax, "Array Calibration in the Presence of Multipath," IEEE Transactions on Signal Processing, vol. 48, No. 1, pp. 53-59, Jan. 2000.

Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

R. Schmidt, "Multiple Emitter Location and Signal Parameter Estimation," IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

A.J. Paulraj, C.B. Papadias, "Space-Time Processing for Wireless Communications", IEEE Signal Processing Magazine, vol. 11, Nov. 1997, pp. 49-83.

C.B. Papadias, A.J. Paulraj , "Space-Time Signal Processing for Wireless Communications: A Survey", Information Systems Laboratory, Stanford University, Apr. 16-18, 1997, 4pages.

M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

Mati Wax, "Position Location from Sensors with Position Uncertainty," IEEE Transactions Aerospace and Electronic Systems, vol. AES-19, No. 5, Sep. 1983, pp. 658-662.

D.J. Torrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of DF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

N.J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in CDMA Cellular Networks," IEEE Transactions on Vehicular Technology, vol. 47, No. 2, May 1998, pp. 406-416.

J. Caffery. Jr., "A New Approach to the Geometry of TOA Location," IEEE, VTC 2000, pp. 1943-1949.

M.Silventoinen and T. Rantalainen, "Mobile Station Emergency Locating in GSM", Process IEEE International Conference, Personal Wireless Communications, vol. 1, 1996, pp. 232-238.

\* cited by examiner

SYSTEM AND METHOD FOR TOTAL FLIGHT TIME RATIO PATTERN MATCHING

CROSS REFERENCES

The present application is co-pending with and claims the priority benefit of the provisional application entitled "Total Flight Time Ratio Pattern Matching", Application Ser. No. 61/421,485, filed on Dec. 9, 2010, the entirety of which is incorporated herein by reference.

BACKGROUND

Applicant's disclosure is generally directed towards the location of a mobile device within a communications network. It is well known to determine the location of a mobile device based on signals that are transmitted by the mobile device and received at a plurality of reference stations. When a location estimation technique is dependent on signal arrival time or signal transit time measurements, it is also well recognized that signal multipath is often highly deleterious to the accuracy of the location estimate. Multipath generally refers to the reflection of a signal or component of a signal off an object between a transmitter and a receiver.

In the context of a wireless network, a mobile device or mobile station may transmits an uplink signal to an access point or base station having a certain functional relationship (in terms of signal timing) with respect to downlink signals transmitted by a serving access point or base station. This functional relationship may permit an extraneous system to observe the transmissions between mobile devices and the access point, and by doing so, determine the time of transmission for a given signal from the mobile device.

Knowing or determining the time of transmission of a signal from a mobile device, and the time at which this same signal is received at a set of other observing stations (e.g., Wireless Location Sensors or WLSs), it is possible to obtain ranges representing the distance of the mobile device to each WLS. There is a need in the art, however, for a system and method to determine the location of a mobile device and to combat multipath effects.

In view of these needs, one embodiment of the present subject matter provides a method of estimating the location of a mobile device. The method may include determining the time of transmission of a first signal from a base station and receiving the first signal at the mobile device. A second signal may be transmitted from the mobile device, the second signal being a function of the first signal advanced by a timing parameter and a time of receipt of the second signal at a first reference station determined. A first range of the mobile device from the first reference station may then be determined as a function of the determined time of transmission of the first signal and the determined time of receipt of the second signal. A plurality of grid points may be provided in a geographic region, the plurality of grid points containing the first reference station, and a first relationship may be determined between the determined first range and a first range metric for each of the plurality of grid points. A second relationship may also be determined for each of the plurality of grid points whereby the first and second relationships may be compared. From this comparison a location of the mobile device may be determined.

Another embodiment of the present subject matter provides a method for estimating the location of a mobile device. The method may comprise the step of determining a range of a mobile device to a reference station as a function of the time of transmission of a first signal transmitted from a base station and as a function of the time of receipt of a second signal transmitted from the mobile device to the reference station, the second signal being a function of the first signal advanced by a timing parameter. The method may further include providing a plurality of grid points in a geographic region, the plurality of grid points containing the reference station. A relationship may be determined for each of the plurality of grid points as a function of the determined range and a range metric and then the determined relationship compared with data corresponding to each of the plural grid points. A location of the mobile device may then be determined as a function of the comparison.

A further embodiment of the present subject matter may provide a method for estimating the location of a mobile device in a geographic region including the step of determining a range of a mobile device to a reference station as a function of the time of transmission of a first signal transmitted from a base station and received by the mobile device and as a function of a second signal transmitted from the mobile device to a reference station, the second signal being a function of the first signal advanced by a timing parameter. The method may further include defining the geographic region by a plurality of grid points and determining a relationship for each of the plurality of grid points as a function of the determined range and a range metric. The determined relationship may then be compared with data corresponding to each of the plurality of grid points to determine a location of the mobile device.

An additional embodiment of the present subject matter provides a system for estimating the location of a mobile device. The system may include circuitry for determining a range of a mobile device to a reference station as a function of the time of transmission of a first signal transmitted from a base station and as a function of the time of receipt of a second signal transmitted from the mobile device to the reference station, the second signal being a function of the first signal advanced by a timing parameter. The system may further include a processor for determining a plurality of grid points in a geographic region, the plurality of grid points containing the geographic location of the reference station and may include circuitry for determining a relationship for each of the plurality of grid points as a function of the determined range and a range metric. Further, the system may provide circuitry for comparing the determined relationship with data corresponding to each of the plural grid points and may provide circuitry for determining a location of the mobile device as a function of the comparison.

These and other embodiments of the present subject matter will be readily apparent to one skilled in the art to which the disclosure pertains from a perusal or the claims, the appended drawings, and the following detailed description.

DETAILED DESCRIPTION

With reference to the figures where like elements have been given like numerical designations to facilitate an understanding of the present subject matter, the various embodiments of a system and method for total flight time ratio pattern matching are described.

Embodiments of the present subject matter may generally provide a method and system for determining the location of a mobile device or mobile station. Alternate embodiments may provide for methods and systems having the capability to combat multipath by utilizing a pattern matching scheme based upon a total flight time (TFT) or an elliptic range of a signal from a base station (BS) to a reference station such as a Wireless Location Sensor (WLS) such as, but not limited to a location measurement unit (LMU), via a mobile device whose location is to be determined. Additional embodiments of the present subject matter may provide a capability of mitigating the effect of multipath on these signals from a BS.

Generally, the time at which a signal, or in one embodiment a marker on the signal, is transmitted from a BS may be determined as $t_F$. The BS may be a serving BS or may be a neighboring BS. This may also be referred to as forward link timing. The time at which this signal or marker is received by the reference station may be determined as $t_R$. The mobile device may provide an adjustment to the placement of the marker (i.e., advances the signal) using an observable or decodable parameter f(P). P in one embodiment may be a timing advance (TA) parameter or may be the position of a physical channel frame marker. f(P) may be given by, in the case of the GSM protocol, $f(TA)=3.6928*TA-3*T_S$ where $T_S$ represents the symbol duration in microseconds. Of course, f(P) (as well as $t_F$, and $t_R$) may be determined in a variety of methods and such an example should not limit the scope of the claims appended herewith. This may then result in an exemplary total flight time ($R_{TFT}$) relationship:

$$R_{TFT}=t_R-t_F+f(P) \quad (1)$$

In another embodiment, a plurality of reference stations may also determine or receive their own estimates of their respective flight time relationships.

These exemplary flight time relationships may be extended beyond an ideal measurement due to multipath as multipath may generally result in a total flight time to be larger than what it would be in an ideal situation having no multipath. While noise may also cause total flight time to differ from an ideal measurement, it is known that large variations from the ideal measurement are typically the result of multipath. The existence of multipath on respective total flight time measurements may be inferred from various observations. For example, if the signal observed at a reference station is obtained on more than one antenna, discrepancies in the measurement of $t_R$ between the antennas may be an indicator of multipath. Additionally, a large variance observed in a sequence of measurements of $R_{TFT}$ may also be indicative of multipath.

With knowledge of one or more sets of these total flight times, a pattern matching algorithm may be utilized in an exemplary embodiment to determine a location of the mobile device. For example, the reference patterns to be matched against may be, in one embodiment, the relative proportions for the total flight times for each candidate point in a grid. In an exemplary embodiment, grid points may be determined by gathering and analyzing calibration data for various points within a geographic region. Exemplary calibration data may be contained in Network Measurement Reports (NMR) or may be determined utilizing historical or other data available in a geographic region or may be determined or obtained using other known methods. In order to do so geographic coordinates may be assigned to grid points located in a geographic region. The grid points may be non-uniformly, uniformly and/or randomly spaced throughout the geographic region. The data for the grid points may be obtained for each of several calibration points, which may be discrete points within a region R each having geographical coordinates (e.g., latitude and longitude) associated therewith. The calibration data may include, but is not limited to: (a) signal strengths observed for signals transmitted by a set of transmitters of known location within or in proximity to the region R; (b) signal strength of a transmitter located at the calibration point as measured by a set of receivers of known location within or in proximity to the region R; (c) round trip time for a signal between the calibration point and an external known point; (d) time difference of arrival at the calibration point with respect pairs of external points located within or in proximity to region R as measured by either a receiver at the calibration point or the external points; (e) the serving cell or sector for a mobile device operating at that calibration point; (f) the network state at the time of collection—a finite number of such states may be required to distinguish between network conditions that vary diurnally, weekly or in some other manner; and (g) combinations of the above. Thus, in general, the data for these grid points may be any of those measurements made by a mobile device located at the calibration point and/or any measurement made on the transmissions or characteristics of the mobile device at a set of external transmitter/receivers in the region R or in proximity thereto.

Figure 1:
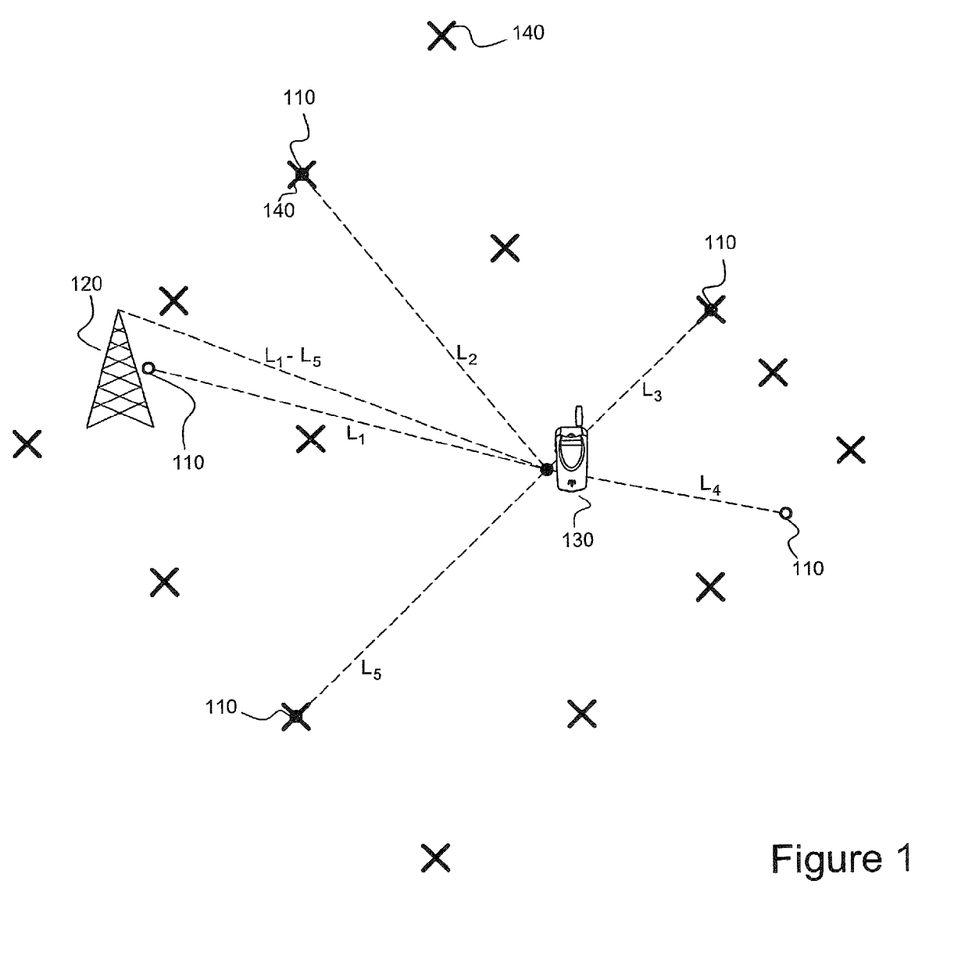
FIG. 1 is a graphical representation of one embodiment of the present subject matter.

FIG. 1 is a graphical representation of one embodiment of the present subject matter. With reference to FIG. 1, a location scenario is presented in which it may be assumed, for example, that a pattern match is required involving five LMUs 110 and one serving BS 120, for each point 140 in a grid of points containing one or more of the five LMUs 110 as interior points, the total flight times from the serving BS 120 to each LMU 110 via a mobile device 130 may be obtained as distances $D_1, D_2, D_3, D_4, D_5$. A Root Mean Square total flight time $D_{RMS}$ may then be determined using the following relationship:

$$D_{RMS} = \sqrt{\sum_{k=1}^{n} (v_k * D_{k_1} * D_{k_n})} \quad (2)$$

In equation (2) above, $v_k$ represents a set of weights. For example, one exemplary $v_k$ may employ a normalized fourth power of an inverse variance of a set of measurements of the total flight time associated with the $k^{th}$ LMU. In another embodiment the weights may be dependent upon current measurements (e.g., the measurements are associated with a respective location request), and an exemplary pattern matching database may be created substantially in real time. Further, if the set of weights $v_k$ is predetermined, e.g., from historical data, an exemplary database may be generated prior to a location request.

In one embodiment, the reference pattern to be matched against may utilize the weighted quantity $D_{RMS}$ as a divisor as shown in the relationship below.

$$\left\{\frac{D_k}{D_{RMS}}\right\}, k = 1, 2, 3 \ldots \quad (3)$$

Thus the divisor employed in creating an exemplary reference pattern may be dependent upon ideal total flight times from a grid point 140 to the set of LMUs 110, and the pattern may represent the relative size of each such total flight time with respect to the weighted RMS total flight time at that grid point 140.

It follows that the ratios $\{D_k/D_{RMS}\}$, k=1, 2, 3, 4, 5 . . . , may be predetermined and stored in a database; therefore, an exemplary database may include varying numbers or sets of LMUs and for each set the total flight time ratios may be predetermined and stored. In an alternative embodiment, most likely total flight time ratio sets may also be stored. Thus, when a less likely combination of LMUs and a serving BS site occurs, the ratios may be determined in real time. In yet a further embodiment, an exemplary database may be populated in real-time or substantially in real-time as location requests are received. Thus, it is preferable that embodiments of the present subject matter provide a database populated with some form of total flight time ratios. In yet a further embodiment, a combination of predetermined and real-time or substantially real-time elements for a database may be employed. For example, one embodiment of the present subject matter may utilize predetermined, ideal total flight times for each grid point and may utilize real-time weighted total flight times when the weighting is dependent on current measurements.

These total flight time ratios may thus be viewed as a pattern. For example, visualizing these total flight time ratios as variable length spokes on a bicycle wheel, the number of spokes may correspond to the number of reference stations or LMUs and the length of each spoke may correspond to the ratio of an ideal total flight time to a respective reference station divided by an ideal weighted total flight time.

In one embodiment of the present subject matter, ideal total flight time ratios may be compensated for multipath effects. For example, when a location request is received for a target mobile device by an exemplary system, the location request may trigger a series of events resulting in the availability of total flight times for a set of reference stations (e.g., LMUs), resulting in the definition of a particular serving BS, and resulting in information (via the total flight time variances or other means) regarding aggregate noise and/or multipath for each total flight time. In one non-limiting embodiment total flight time variance may be utilized as an indicator of the existence of multipath (e.g., the larger the variance the more likely the signal has multipath), and a set of adjustments to that total flight time may be defined.

In an exemplary embodiment, a site (e.g., reference station, etc.) may be defined as having a minimum variance in its respective total flight times as $MIN_{VAR_{SITE}}$. A set of candidate adjustments for the $MIN_{VAR_{SITE}}$ may be constructed as, for example, a set of equi-spaced numbers. For each possible adjustment performed to the total flight times of the $MIN_{VAR_{SITE}}$ sites having larger variances may be considered and adjustments determined on the total flight times for each of these sites. These adjustments may generally be termed as ZETA. For the $MIN_{VAR_{SITE}}$, ZETA may provide a range from $$ZETA_{MIN_{MIN_{VAR}}} \text{ to } ZETA_{MAX_{MIN_{VAR}}}$$

with a step size of $$ZETA_{STEP_{MIN_{VAR}}}.$$

By way of a non-limiting example, $$ZETA_{MIN_{MIN_{VAR}}} = -500 \text{ m},$$

$$ZETA_{MAX_{MIN_{VAR}}} = 2000 \text{ m},$$

$$ZETA_{STEP_{MIN_{VAR}}} = 10 \text{ m}.$$

For any other given site, the ZETA range may be determined utilizing the below relationships:

$$ZETA_{MIN_{SITE}} = ZETA_{MIN_{MIN_{VAR}}} * \sqrt{\frac{varSite}{varMinVar}} \quad (4)$$

$$ZETA_{STEP_{SITE}} = ZETA_{STEP_{MIN_{VAR}}} * \sqrt{\frac{varSite}{varMinVar}} \quad (5)$$

where varSite represents the variance of total flight time at a given site and varMinVar represents the variance of the total flight time at $MIN_{VAR_{SITE}}$. As long as the variances of total flight times are different, the starting adjustments and step sizes of the respective ZETA ranges will be different. As variances are real numbers derived from multiple real measurements, it follows that these variances are not equal to the others and follows that the adjustments for different sites are also different. If, however, the variances are equal, a small random variation may be applied thereon such that the variances would be different.

If, however, $ZETA_{STEP_{SITE}}$ is larger than a predetermined threshold, e.g., $$ZETA_{DIFF_{THRESHOLD_{MAX}}},$$

the value determined utilizing Equation (5) above may be reset utilizing the relationship below.

$$ZETA_{STEP_{SITE}} = \frac{ZETA_{STEP_{SITE}}}{ceil\left(\frac{ZETA_{STEP_{SITE}}}{ZETA_{DIFF_{THRESHOLD_{MAX}}}}\right)} \quad (6)$$

where Ceil represents an exemplary ceiling function. In embodiments having a candidate ZETA adjustment for the $MIN_{VAR_{SITE}}$, the corresponding ZETA adjustment for a different site's total flight time may be selected by determining the applicable ZETA from a set of ZETAs created for that site based upon Equations (4) and (5) above that is closest to the ZETA for the total flight time of the previously adjusted site but also satisfies Equation (7) below.

$$ZETA_{SITE} - ZETA_{Previous} \geq ZETA_{DIFF_{THRESHOLD_{MIN}}} \quad (7)$$

Therefore, the current ZETA may be more than at least $$ZETA_{DIFF_{THRESHOLD_{MIN}}}$$

with respect to the previous ZETA (e.g., these sites may be, in one embodiment, adjusted in order of increasing variance) thereby placing a lower bound to how close a given ZETA can be to the previous site's ZETA. The relationships provided above may thus ensure that ZETA adjustments for any two total flight times associated with two sites or reference stations would be different.

An exemplary algorithm, computer program, data processing apparatus, or circuitry may operate by considering a particular adjustment in the set of candidate adjustments for the primary reference station or LMU (one member of that set) and applying that adjustment to the measured total flight time for that reference station. The adjustment may, in one embodiment, then be applied negatively, that is, the value of ZETA may be subtracted from the total flight time. For example, if the measured total flight time for the primary LMU is represented as $R_1$, the adjusted total flight time may be represented as:

$$R_{1_{adj}} = R_1 - ZETA_1 \qquad (8)$$

where the quantity $ZETA_1$ represents the adjustment drawn from the set of adjustments for the primary LMU. Selecting an adjustment for a non-primary site or LMU, as described earlier, an adjusted total flight time for $LMU_k$ may be generated as:

$$R_{k_{adj}} = R_k - ZETA_k \qquad (9)$$

With the adjusted total flight times expressed as the set $\{R_{k_{adj}}\}$, a weighted RMS total flight time may be determined utilizing the following relationship:

$$R_{RMS} = \sqrt{\sum_{k=1}^{n} (v_k * R_{k_{adj}} * R_{k_{adj}})} \qquad (10)$$

where $v_k$ may represent those weights previously employed to form the patterns that were stored. One exemplary and non-limiting set of weights $v_k$ may employ a normalized fourth power of the inverse variance of a set of measurements of the total flight time associated with the $k^{th}$ LMU.

For example, assuming that $w_k$ represents the variance of a total flight time for the $k^{th}$ LMU, then the normalized fourth power of the inverse variance may be utilized as $v_k$ as exemplified in the following relationship:

$$v_k = \frac{\left(\frac{1}{w_k}\right)^4}{\sum_{1}^{n} \left(\frac{1}{w_k}\right)^4} \qquad (11)$$

Exemplary total flight time ratio patterns may then be obtained as:

$$\left\{\frac{R_{k_{adj}}}{R_{RMS}}\right\}, k = 1, 2, 3 \ldots \qquad (12)$$

Thus, this exemplary embodiment may offer a certain stability in the determined ratios, in comparison to an embodiment having a divisor as the primary total flight time. Further, if there are other reference stations having a low variance total flight times, these may also be drawn into the denominator term utilized to form the ratios. For example, if the primary reference station or LMU provides a low variance and other total flight times provide a relatively high variance, $R_{RMS}$ may converge to the primary site value, namely $R_{1_{adj}}$. If, however, there is more than one total flight time having a low variance, $R_{RMS}$ may possess some component of such a total flight time thus making the respective total flight time ratio pattern more robust and stable thereby resulting in an enhanced stability and improved location performance.

In a further embodiment of the present subject matter, this observed total flight time ratio pattern may be pattern matched or compared with a stored database. Thus, for every grid point in the database and every adjustment of the primary total flight time (the adjustments for non-primary total flight times may follow the lead of the primary adjustment as described above), a pattern matching metric may be obtained that is indicative of the respective fit or quality. Exemplary pattern matching metrics may be, but are not limited to, a Euclidean distance, a weighted Euclidean distance (employing the variances once again as weights), a Mahalanobis distance, or other distance measures. Another embodiment may employ a weighted Euclidean distance having inverse variances as weights. Having a metric associated with each grid point and thus with each possible value of the adjustment applied to a primary reference station, an estimated location of the mobile device may be selected as the grid point having the best metric.

Figure 2:
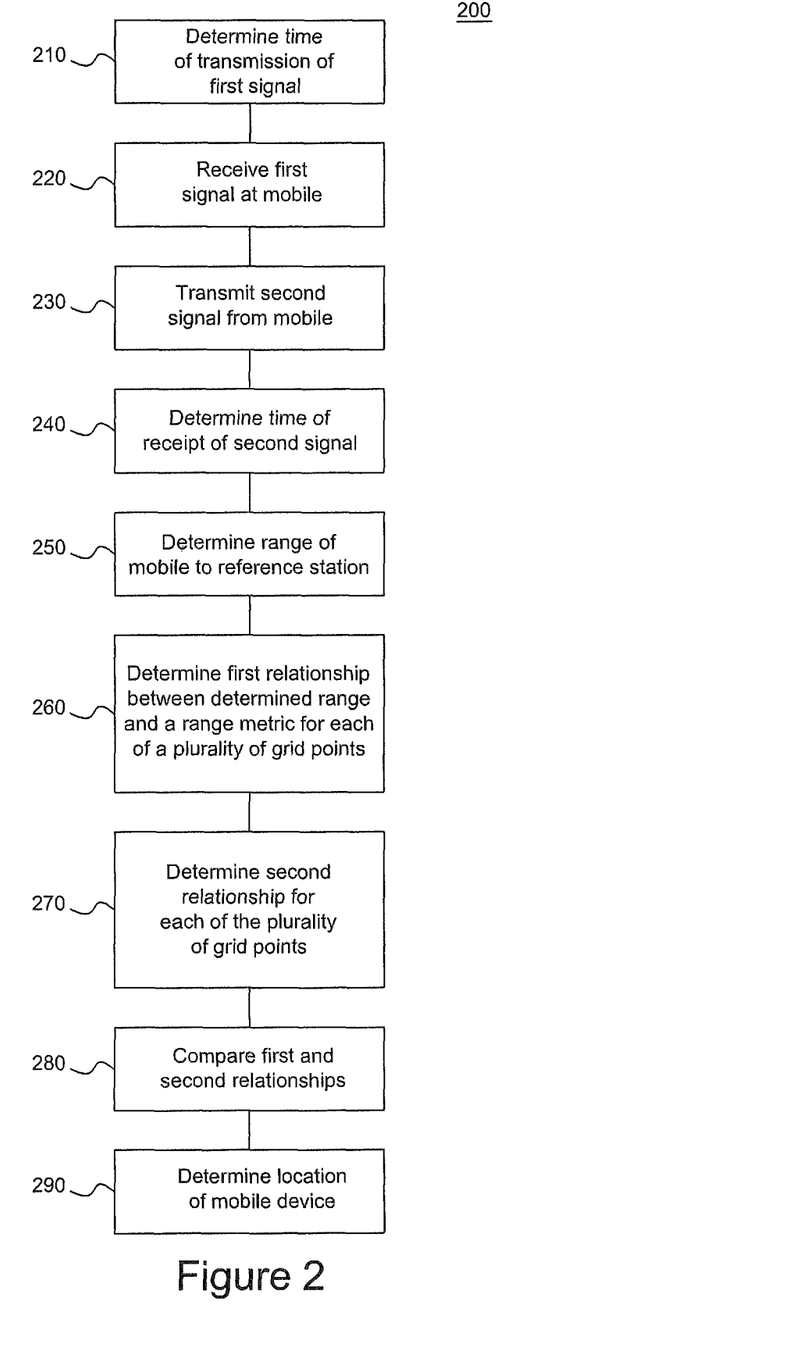
FIG. 2 is a block diagram of one embodiment of the present subject matter.

FIG. 2 is a block diagram of one embodiment of the present subject matter. With reference to FIG. 2, an exemplary method 200 of estimating the location of a mobile device may include at step 210, determining the time of transmission of a first signal from a base station, and at step 220 receiving the first signal at the mobile device. The mobile device and the base station may or may not be synchronized. In one embodiment, the time of transmission of the first signal may be determined from the time of transmission of a marker in the first signal. At step 230, a second signal may be transmitted from the mobile device, the second signal being a function of the first signal advanced by a timing parameter. In one embodiment, the timing parameter may be determined as a function of a TA or the position of a physical channel frame marker. At step 240, a time of receipt of the second signal at a first reference station may be determined. The reference station may or may not be co-located with the base station. Further, the first reference station may be a receiver at a known location. A first range of the mobile device from the first reference station may then be determined at step 250 as a function of the determined time of transmission of the first signal and the determined time of receipt of the second signal. In one embodiment, this determined first range may be adjusted as a function of the presence of multipath. Step 250 may be performed at the reference station, or in embodiments having a plurality of reference stations, at any one of the plural reference stations. Additionally, step 250 may be performed at a centralized site remote to the one or plural reference stations.

At step 260, a first relationship may be determined between the determined first range and a first range metric for each of a plurality of grid points in a geographic region. In one embodiment, step 260 may include determining a ratio of the determined first range of the mobile device with a weighted metric of the determined first range for each of the plurality of grid points. These grid points may contain the first reference station. Further, one or more of the plurality of grid points may correspond to the first reference station. In one embodiment, each reference station may correspond to a grid point. Any number of these grid points may be randomly located within the geographic region and/or may be located on a predetermined fixed uniform grid defined over the geographic region.

At step 270, a second relationship for each of the plurality of grid points may be determined and the first and second relationships compared at step 280. In one embodiment, the second relationship may be determined using an ideal range from the first reference station to a grid point. In another embodiment, step 280 may include comparing the determined first relationship with second relationships from a database of historical data, from a database substantially populated in real-time, or from a combination of a database of historical data and a database substantially populated in real-time. At step 290, a location of the mobile device may be determined as a function of the comparison of the first and second relationships. Of course, while only one reference station has been referenced with respect to FIG. 2, this should not limit the scope of the claims appended herewith as embodiments of the present subject matter are equally applicable to a plurality of reference stations. In such an embodiment, a time of receipt of the second signal may be determined at a plurality of reference stations and additional ranges of the mobile device to the plurality of reference stations determined as a function of the determined time of transmission of the first signal and determined times of receipt of the second signal at the plurality of reference stations. Of course, the plurality of grid points may contain the plurality of reference stations. It also follows that any number or all of these additional ranges may also be adjusted as a function of the presence of multipath. This adjustment to the ranges may be different for each range or for certain ranges or all adjustments may be the same.

Figure 3:
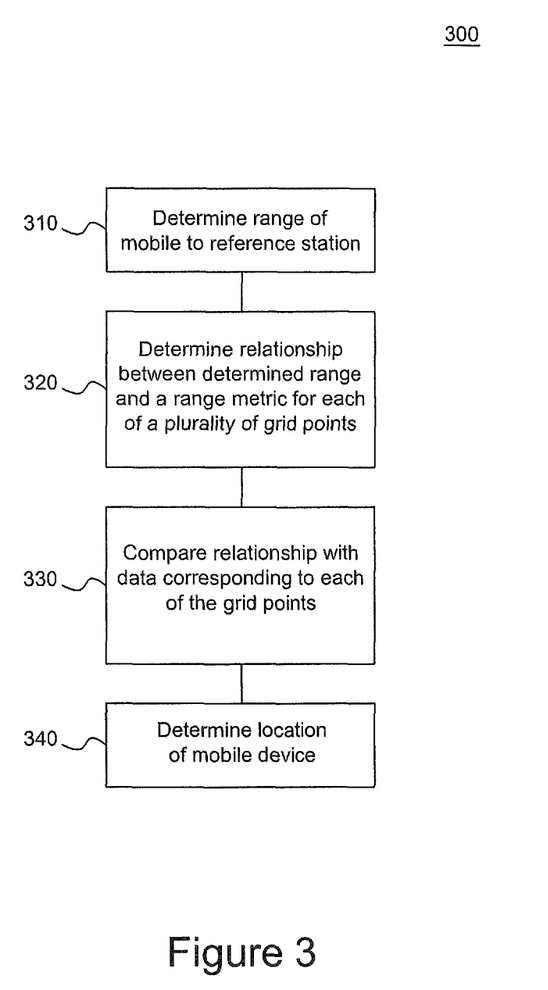
FIG. 3 is a block diagram of a further embodiment of the present subject matter.

FIG. 3 is a block diagram of a further embodiment of the present subject matter. With reference to FIG. 3, a method 300 of estimating the location of a mobile device may include at step 310 determining a range of a mobile device to a reference station as a function of the time of transmission of a first signal transmitted from a base station and as a function of the time of receipt of a second signal transmitted from the mobile device to the reference station, the second signal being a function of the first signal advanced by a timing parameter. In one embodiment, the determined range may be adjusted as a function of the presence of multipath.

At step 320, a relationship may be determined for each of a plurality of grid points in a geographic region as a function of the determined range and a range metric. The plurality of grid points may contain the reference station. At step 330, the determined relationship may be compared with data corresponding to each of the plural grid points, and a location of the mobile device determined at step 340 as a function of the comparison. Of course, while only one reference station has been referenced with respect to FIG. 3, this should not limit the scope of the claims appended herewith as embodiments of the present subject matter are equally applicable to a plurality of reference stations. In such an embodiment, step 310 may further include determining a time of receipt of the second signal at the plurality of reference stations, and determining additional ranges of the mobile device to the plurality of reference stations as a function of the determined time of transmission of the first signal and as a function of the determined times of receipt of the second signal. It follows that this embodiment may also include the step of adjusting the determined additional ranges as a function of the presence of multipath. This adjustment to the ranges may be different for each range or for certain ranges or all adjustments may be the same. Of course, an exemplary system may include processors, circuitry and the like to perform any one or all of the previously mentioned steps.

Figure 4:
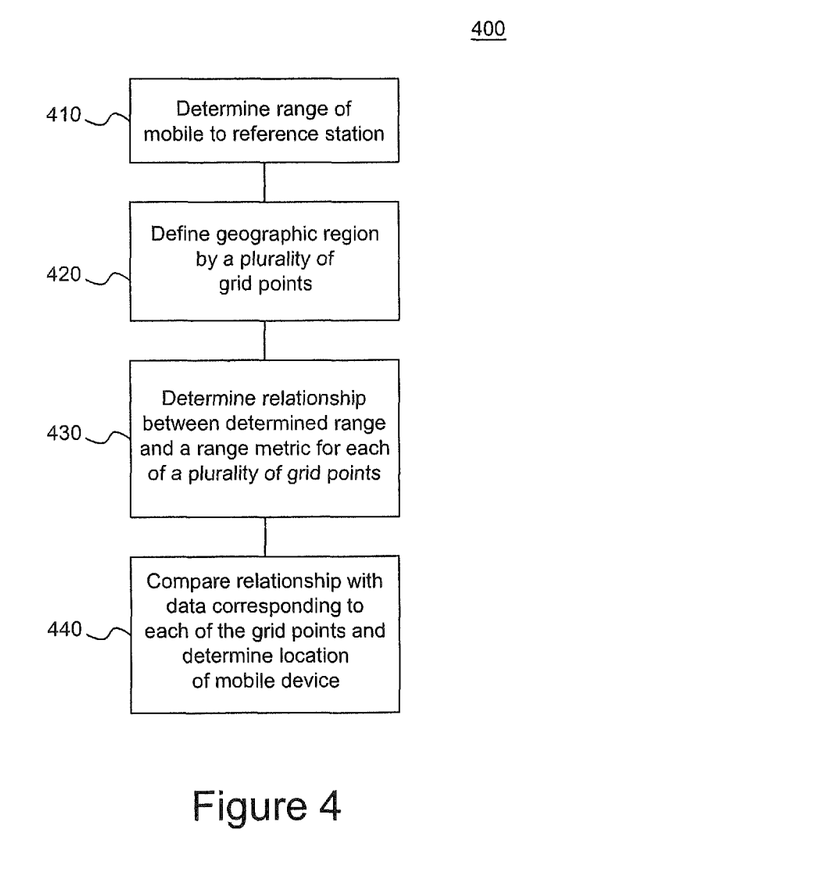
FIG. 4 is a block diagram of an additional embodiment of the present subject matter.

FIG. 4 is a block diagram of an additional embodiment of the present subject matter. With reference to FIG. 4, a method 400 for estimating the location of a mobile device in a geographic region may include at step 410 determining a range of a mobile device to a reference station as a function of the time of transmission of a first signal transmitted from a base station and received by the mobile device and as a function of a second signal transmitted from the mobile device to a reference station, the second signal being a function of the first signal advanced by a timing parameter. The method may further include at step 420 defining the geographic region by a plurality of grid points, and determining a relationship for each of the plurality of grid points as a function of the determined range and a range metric at step 430. At step 440, the determined relationship may be compared with data corresponding to each of the plurality of grid points to determine a location of the mobile device.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims. Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal that is generated to encode information for transmission to suitable receiver apparatus for execution by a computer. The computer readable medium can be a machine-readable storage device, a machine-readable storage substrate, a memory device, a composition of matter affecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet. The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As shown by the various configurations and embodiments illustrated in FIGS. 1-4, a system and method for total flight time ratio pattern matching have been described.

While a few embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method of estimating the location of a mobile device comprising the steps of:
   (a) determining the time of transmission of a first signal from a base station;
   (b) receiving the first signal at the mobile device;
   (c) transmitting a second signal from the mobile device, the second signal being a function of the first signal advanced by a timing parameter;
   (d) determining a time of receipt of the second signal at a first reference station;
   (e) determining a first range of the mobile device from the first reference station as a function of the determined time of transmission of the first signal and the determined time of receipt of the second signal;
   (f) providing a plurality of grid points in a geographic region, the plurality of grid points containing the first reference station;
   (g) determining a first relationship between the determined first range and a first range metric for each of the plurality of grid points;
   (h) determining a second relationship based on an ideal range from the first reference station to each of the plurality of grid points;
   (i) comparing the first and second relationships; and (j) determining a location of the mobile device as a function of the comparison of the first and second relationships.

2. The method of claim 1 further comprising the step of adjusting the determined first range as a function of the presence of multipath.

3. The method of claim 1 further comprising the steps of:
(k) determining a time of receipt of the second signal at a plurality of reference stations;
(l) determining additional ranges of the mobile device to the plurality of reference stations as a function of the determined time of transmission of the first signal and determined times of receipt of the second signal at the plurality of reference stations; and
(m) providing a plurality of grid points in a geographic region, the plurality of grid points containing the plurality of reference stations.

4. The method of claim 3 further comprising the step of adjusting the determined additional ranges as a function of the presence of multipath.

5. The method of claim 4 wherein the adjustments to the additional ranges are different from each other.

6. The method of claim 3 wherein each reference station corresponds to a grid point.

7. The method of claim 1 wherein one of the plurality of grid points corresponds to the first reference station.

8. The method of claim 1 wherein one of the plurality of grid points is randomly located within the geographic region.

9. The method of claim 1 wherein one of the plurality of grid points is located on a predetermined fixed uniform grid defined over the geographic region.

10. The method of claim 1 wherein the time of transmission of the first signal is determined from the time of transmission of a marker in the first signal.

11. The method of claim 1 wherein the step of comparing further comprises comparing the determined first relationship with second relationships provided from a database of historical data, from a database substantially populated in real-time, or from a combination of a database of historical data and a database substantially populated in real-time.

12. The method of claim 1 wherein the timing parameter is determined as a function of a timing advance (TA) or the position of a physical channel frame marker.

13. A method of estimating the location of a mobile device comprising the steps of:
(a) determining the time of transmission of a first signal from a base station;
(b) receiving the first signal at the mobile device;
(c) transmitting a second signal from the mobile device, the second signal being a function of the first signal advanced by a timing parameter;
(d) determining a time of receipt of the second signal at a first reference station;
(e) determining a first range of the mobile device from the first reference station as a function of the determined time of transmission of the first signal and the determined time of receipt of the second signal;
(f) providing a plurality of grid points in a geographic region, the plurality of grid points containing the first reference station;
(g) determining a first relationship between the determined first range and a first range metric for each of the plurality of grid points;
(h) determining a second relationship for each of the plurality of grid points;
(i) comparing the first and second relationships; and
(j) determining a location of the mobile device as a function of the comparison of the first and second relationships;

wherein the step of determining a first relationship further comprises determining a ratio of the determined first range of the mobile device with a weighted metric of the determined first range for each of the plurality of grid points.

14. The method of claim 13 wherein the second relationship is determined using an ideal range between the first reference station and a grid point.

15. A method of estimating the location of a mobile device comprising the steps of:
(a) determining a range of a mobile device to a reference station as a function of the time of transmission of a first signal transmitted from a base station and as a function of the time of receipt of a second signal transmitted from the mobile device to the reference station, the second signal being a function of the first signal advanced by a timing parameter;
(b) providing a plurality of grid points in a geographic region, the plurality of grid points containing the reference station;
(c) determining a relationship for each of the plurality of grid points as a function of the determined range and a range metric;
(d) comparing the determined relationship with data corresponding to each of the plural grid points; and
(e) determining a location of the mobile device as a function of the comparison.

16. The method of claim 15 further comprising the step of adjusting the determined range as a function of the presence of multipath.

17. The method of claim 15 wherein the step of determining a range further comprises:
(i) determining a time of receipt of the second signal at a plurality of reference stations; and
(ii) determining additional ranges of the mobile device to the plurality of reference stations as a function of the determined time of transmission of the first signal and as a function of the determined times of receipt of the second signal.

18. The method of claim 17 further comprising the step of adjusting the determined additional ranges as a function of the presence of multipath.

19. The method of claim 18 wherein the adjustments to the additional ranges are different from each other.

20. A system for estimating the location of a mobile device comprising:
(a) circuitry for determining a range of a mobile device to a reference station as a function of the time of transmission of a first signal transmitted from a base station and as a function of the time of receipt of a second signal transmitted from the mobile device to the reference station, the second signal being a function of the first signal advanced by a timing parameter;
(b) a processor for determining a plurality of grid points in a geographic region, the plurality of grid points containing the geographic location of the reference station;
(c) circuitry for determining a relationship for each of the plurality of grid points as a function of the determined range and a range metric;
(d) circuitry for comparing the determined relationship with data corresponding to each of the plural grid points; and
(e) circuitry for determining a location of the mobile device as a function of the comparison.

21. In a method for estimating the location of a mobile device in a geographic region, the method including determining a range of a mobile device to a reference station as a function of the time of transmission of a first signal transmitted from a base station and received by the mobile device and as a function of a second signal transmitted from the mobile device to a reference station, the second signal being a function of the first signal advanced by a timing parameter, the improvement comprising:

defining the geographic region by a plurality of grid points;

determining a relationship for each of the plurality of grid points as a function of the determined range and a range metric;

comparing the determined relationship with data corresponding to each of the plurality of grid points to determine a location of the mobile device; and     determining a location of the mobile device as a function of the comparison.

22. The method of claim 21 further comprising the step of adjusting the determined range as a function of the presence of multipath.

\* \* \* \* \*